E. A. SPEEGLE.
CURRENT WATER MOTOR.
APPLICATION FILED JAN. 4, 1917.
1,267,928.
Patented May 28, 1918.
2 SHEETS—SHEET 1.
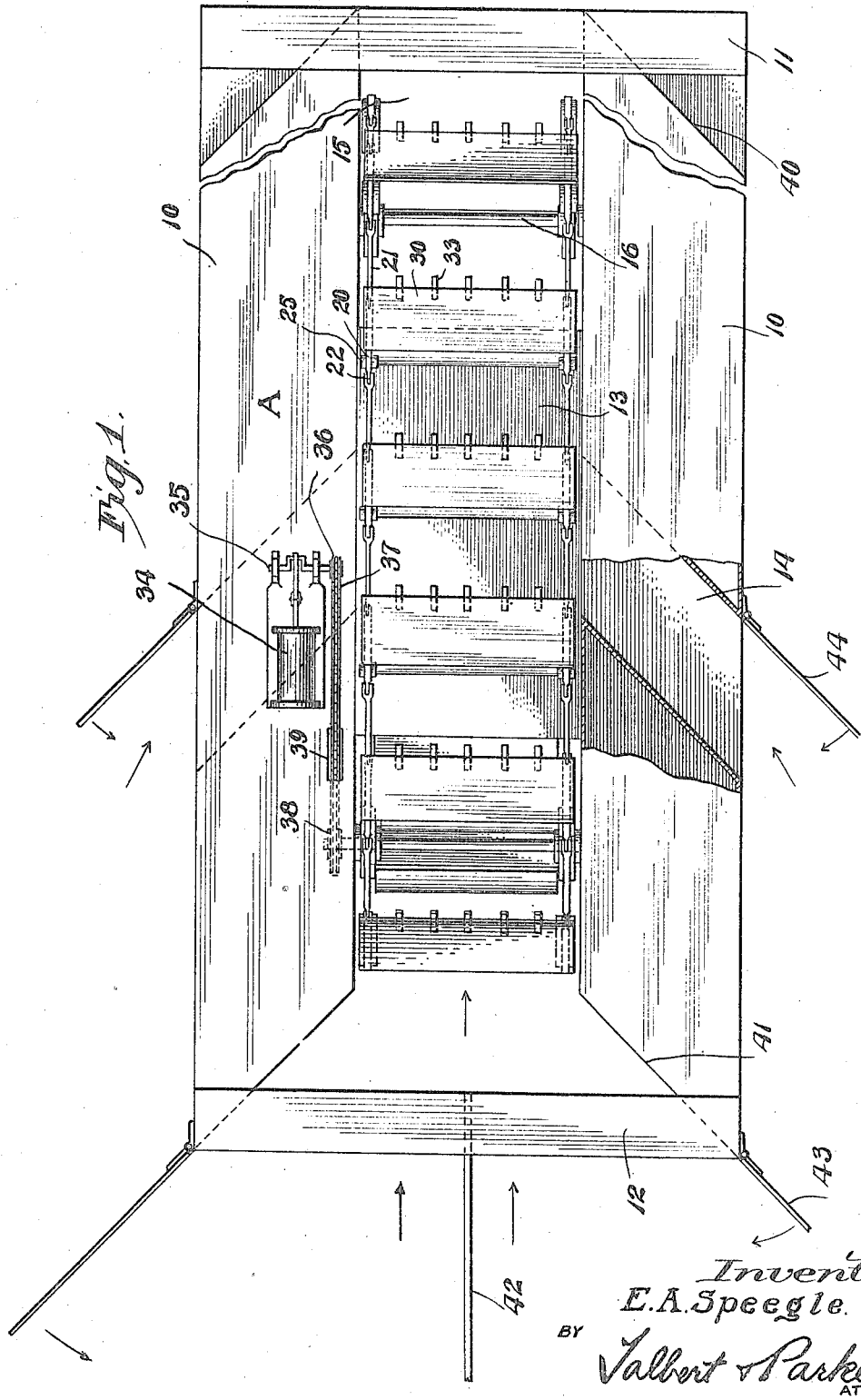
Inventor:
E. A. Speegle.
BY Talbert & Parker
ATTYS.

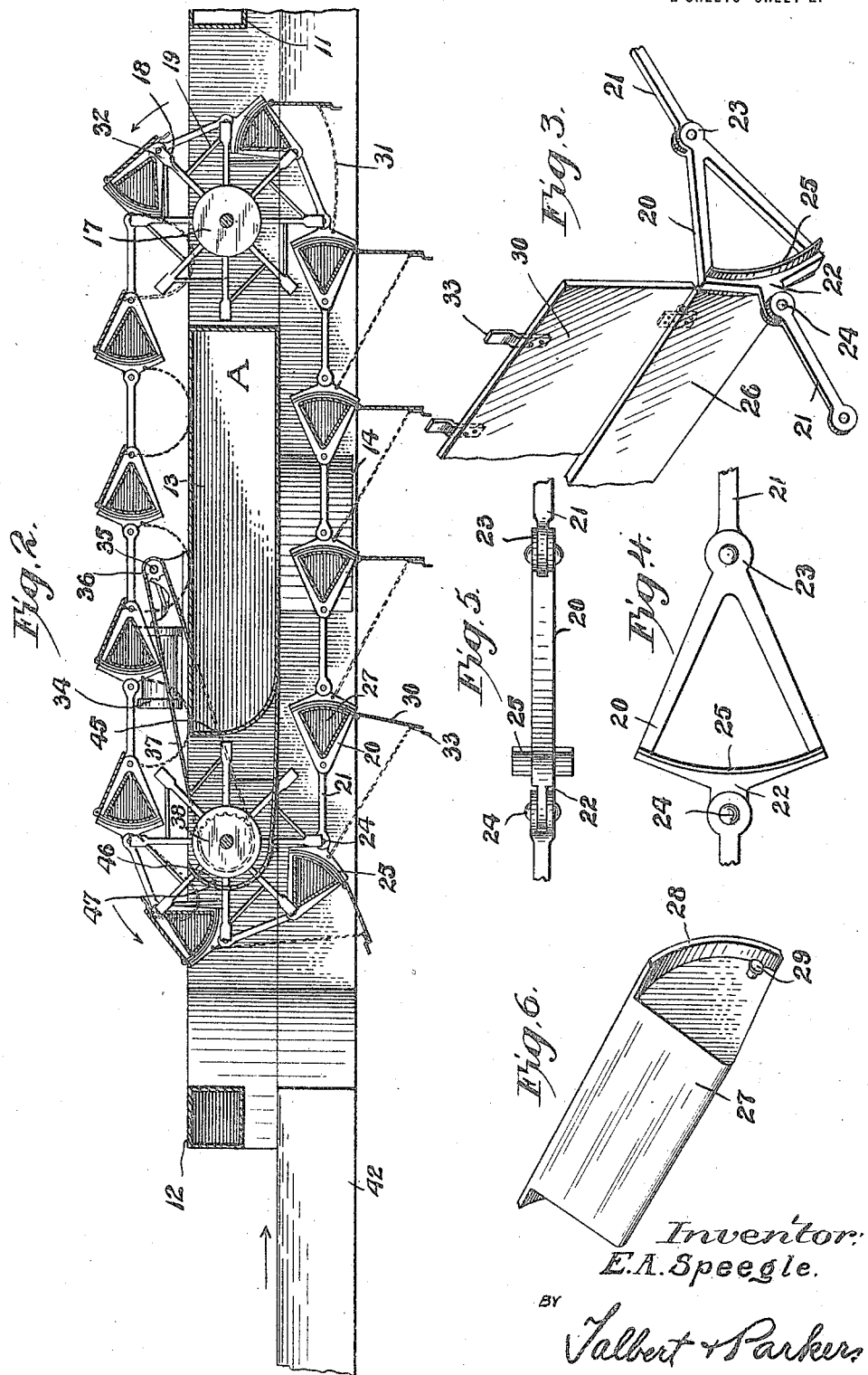

UNITED STATES PATENT OFFICE.

EMANUEL A. SPEEGLE, OF WASHINGTON, DISTRICT OF COLUMBIA.

CURRENT WATER-MOTOR.

1,267,928. Specification of Letters Patent. Patented May 28, 1918.

Application filed January 4, 1917. Serial No. 140,571.

*To all whom it may concern:*

Be it known that I, EMANUEL A. SPEEGLE, a citizen of the United States, residing at Washington, in the District of Columbia, have invented certain useful Improvements in Current Water-Motors, of which the following is a specification, reference being had therein to the accompanying drawing.

The invention relates to a current motor, and more particularly to the class of water motors.

The primary object of the invention is the provision of a water motor of this character wherein the construction thereof enables the utilization of the kinetic energy of rivers, creeks, canals, waterfalls, tides and ocean waves which is converted into potential power.

Another object of the invention is the provision of a current water motor wherein the construction thereof is formed with a specially designed flume, race, scow or barge to concentrate the flow of the water to increase or decrease the flow of the water by means of oscillating gates and to make the flume, race, scow or barge, with the assistance of the current water motor, automatically clear said motor of any debris which may obstruct or retard its efficiency and to provide for the whole to rise and fall with the streams, tides and ocean waves when necessary.

A still further object of the invention is the provision of a current water motor wherein an air tank on the flume, race, scow or barge is provided at the upstream end to form a dam, thus giving a submerged orifice effect, thereby increasing the current water motor's efficiency.

A still further object of the invention is the provision of a current water motor wherein triangularly formed frames are provided so as to act as teeth on an endless belt or chain and also a supporting means for the blades and interchangeable buoys movably carried by said chain or belt.

A still further object of the invention is the provision of a current water motor of this character wherein the interchangeable buoys or floats are attached to or within the triangularly formed frames in such a manner as to permit the interchanging thereof with despatch and thereby assure uniform wear.

A still further object of the invention is the provision of a current water motor of this character wherein the buoys or floats carry removable taps or plugs so that said floats can receive or expel water ballast as required for the greatest efficiency of the motor.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a top plan view of a current water motor constructed in accordance with the invention, the same being partly broken away and in section;

Fig. 2 is a vertical central longitudinal sectional view thereof;

Fig. 3 is a fragmentary perspective view of one portion of the stretch of the chain and blades;

Fig. 4 is a side elevation of the triangular shaped frame portion of the chain;

Fig. 5 is a top plan view thereof;

Fig. 6 is a perspective view of one of the floats or buoys.

Similar reference characters indicate corresponding parts throughout the several views of the drawings.

Referring to the drawings in detail, A designates generally the flume, scow or barge which comprises spaced parallel side pontoons 10, front and rear end cross members 11 and 12, respectively, and an intermediate air tank 13, which latter extends in depth substantially one-half the depth of the pontoons and its length is considerably shorter than the length of said pontoons. Formed in the pontoons 10 are forwardly convergent water passages 14 which are below the plane of the bottom of the tank 13 to communicate from without opposite sides of the flume, scow or barge to within the waterway 15 between the pontoons.

Forward and aft of the tank 13 and journaled in the inner side walls of the pontoons 10 are axles 16, on each of which is fitted a pair of rotors, each comprising a disk-like hub 17, from the periphery of which extend radial arms 18 which constitute spokes, and connecting the same to one another are braces 19 which are disposed tangentially to an imaginary circle concentrically of the disk 17, and these braces 19 constitute supports or rests for a purpose presently described.

Movable by the rotors are endless conveyers, each comprising series of triangularly shaped open frames 20 and solid links 21, respectively, each frame being formed at its wider end with an ear 22, while at its smaller end are spaced ears 23 to which are pivoted, at 24, the links 21 for flexibly uniting the said frames and links of the conveyers.

In the open frames at the wider ends thereof are formed substantially arcuate shaped flanges 25 to which are fixed the ends of blades 26 which are carried by the conveyers and at one side of each of these blades 26 is arranged a float or buoy 27 which is of substantially triangular shape in cross section and at opposite ends is formed with flanges 28 for the reception of fasteners to permit the detachable connection thereof to the flanges 25 on the frames 20, and in this manner the said floats or buoys 27 are readily interchangeable, as will be obvious. Each float at one end has fitted therein a removable plug 29 for permitting the reception of water or the expulsion of the latter therefrom, which water serves as a ballast when the current water motor is in use or operation.

Hinged to the outer edge of each blade 26 is a swinging impact blade 30 which, by reason of its hinged connection, will swing inwardly at the upper stretches of the conveyers and outwardly at the lower stretches thereof in the operation of the current water motor. Each blade 30 has connected thereto, near its outer edge, flexible members 31 which are connected to the triangularly shaped frames 20 so as to limit the outward swinging movement of the blade 30 when in position for receiving the impact from the water in the operation of the motor.

The arms constituting the spokes 18 of the rotors are formed with outer forked ends 32 so as to accommodate the pivot connections 23 and 24 between the triangularly shaped frames 20 and links 21 of the conveyers, as will be apparent.

On the outer longitudinal edges of the blades 30 are mounted fingers 33 which serve to loosen sand in the bed of the stream of water or the accumulation of such sand in silts or mounds.

Mounted on one of the pontoons 10 is an air compressor 34 provided with a shaft 35 carrying a cog pinion 36 over which is trained an endless chain 37, the same being also trained over a cog gear 38 on one of the axles 16, and located interiorly of the pontoon 10, the top of said pontoon being cut away at 39 for the free passage of the chain 37 therein. On the operation of the rotors the shaft 35 is rotated for actuating the compressor 34 and air is stored up and carried to any suitable tank for storage to perform useful work.

Any other mechanism may be connected directly to the axles 16 so that the energy ordinarily wasted by the movements of the currents of water will be conserved and turned to beneficial results.

The rear ends of the pontoons 10 are beveled at 40 so as to avoid the accumulation of sand or other foreign matter at this end of the flume or scow as the water flowing through the waterway 15 between the pontoons will create a suction action and thereby prevent the accumulation of sand at this end of the scow or barge. At the opposite end of the flume, scow or barge the pontoons 10 are provided with the beveled portions 41 which restrict the flow of water in the direction of the arrows in Fig. 1 of the drawings to the waterway 15 between the pontoons so as to get the full force of the water to render the current water motor thoroughly efficient in its operation.

Centrally of the cross members 12 is a fixed wing 42, while on opposite sides thereof and mounted on the pontoons 10 are swinging gates 43 which can be opened or closed relative to the wing 42 and when in closed position will deflect the flow of water from entrance to the waterway 15 between the pontoons 10. On the opening of the gates 43 the water will be directed from the stream into the waterway 15 between the pontoons 10, as will be apparent.

Carried by the pontoons 10 immediately forwardly of the passages 12 are swinging gates 44 which can be closed for shutting off the flow of water through the passages 14, and on the opening of said gates the water will be deflected thereinto, as will be apparent.

The air tank 13, at the head end thereof, is formed with a forwardly curved or rounded wall 45, while extending from the bottom forwardly of this wall 45 is a guard 46 which has the rounded end 47 so that the flow of water through the waterway 15 will be directed downwardly and thereby prevent the possibility of the flowing of the water over the tank 13 so that the full force and effect of the water is directed to the impact blades 30 when opened at the lower stretches of the conveyers for the efficient working of the motor. These rounded portions 45 of the tank and the guard 46 constitute a dam, thus giving a submerged orifice effect at this end of the flume, scow or barge to materially increase the efficiency of the current water motor.

The triangularly shaped frames 20 of the conveyers constitute supports for the floats or buoys 27 and the blades 26, the buoys or floats 27 being interchangeable to assure uniform wear in the operation of the current water motor.

By reason of the particular construction of the flume, scow or barge and the arrangement of the gates 43 and 44 the water can be concentrated in the flow thereof to increase or decrease such flow, or the flow of water shut off from the motor and also any debris that may obstruct or retard its efficiency, while said flume, scow or barge is so constructed with the tank 13 that as a whole it will rise and fall with the streams, tides and ocean waves when necessary. The floats or buoys 27, by reason of the construction thereof, permit the proper ballast to be had when the motor is in use for the proper efficiency thereof. It is of course to be understood that the position of the motor can be changed, that is, from a substantially horizontal plane to an inclined position for utilizing the water power of a water falls or the overflow from a dam.

Furthermore, it is to be understood that the invention in its particular construction can be used for any purpose desired, and that changes, variations and modifications may be made in the structure such as come properly within the scope of the appended claims without departing from the spirit of the invention or sacrificing any of the advantages thereof.

From the foregoing description, taken in connection with the accompanying drawings, the construction and operation of the herein described current motor will be readily apparent and, therefore, a more extended explanation has been omitted.

Having thus described my invention, I claim:

1. A current water motor comprising a body formed with spaced parallel pontoons providing a water way therebetween and having forwardly convergent passages leading from without to the water way, swinging gates located at one end and forwardly of the passages, an air tank located between the gates above the passages, water operating means located in the water way and supported by the pontoons and supported above and below the tank, a guard extending from one end of the tank and having the outer end curved and constituting a dam for preventing water from passing over the tank and affecting the upper lay of the water operating means.

2. A current water motor comprising a body formed with spaced parallel pontoons providing a water way therebetween, water operated means located in the water way and supported by the pontoons, buoyant elements supported by the water operated means, said water operating means including a pair of flexible conveyers, each having a series of triangular shaped frames and links pivotally connected to each other the longer and outer blades supported by the frames, means for swingingly connecting the outer blades with the inner blades, means for limiting the swinging movement of the outer blades, motors for said conveyers and having radial spokes and tangentially arranged braces forming supports for the triangular shaped frames, and means for detachably connecting the buoyant elements to the inner blades.

3. A current water motor comprising a body formed with spaced parallel pontoons providing a waterway therebetween and having forwardly convergent passages leading from without to the waterway, swinging gates located at one end and forwardly of the passages, water operated means located in the waterway and supported by the pontoons, inwardly directed beveled ends formed on said pontoons, an air tank located between the pontoons above the passages and having a curved end constituting a dam, buoyant elements supported at intervals by the water operated means, and each having a removable plug for permitting the admission and expulsion of water ballast, the water operated means including a pair of flexible conveyers, each having series of triangularly shaped frames and links pivotally connected to each other, inner and outer blades supported by the frames, means for swingingly connecting the outer blades with the inner blades, means for limiting the swinging movement of the outer blades, rotors for said conveyers and having radial spokes and tangentially arranged braces connecting the same and forming supports for the triangularly shaped frames, and means for detachably connecting the buoyant elements to the inner blades.

4. A current water motor comprising a body formed with spaced parallel pontoons providing a waterway therebetween and having forwardly convergent passages leading from without to the waterway, swinging gates located at one end and forwardly of the passages, water operated means located in the waterway and supported by the pontoons, inwardly directed beveled ends formed on said pontoons, an air tank located between the pontoons above the passages and having a curved end constituting a dam, buoyant elements supported at intervals by the water operated means, and each having a removable plug for permitting the admission and expulsion of water ballast, the water operated means including a pair of flexible conveyers, each having series of trinangularly shaped frames and links pivotally connected to each other, inner and outer blades supported by the frames, means for swingingly connecting the outer blades with the inner blades, means for limiting the swinging movement of the outer blades, rotors for said conveyers and having radial spokes and tangentially arranged braces connecting the same and forming supports for the triangularly shaped frames, and means for detachably connecting the buoyant elements to the inner blades, each buoyant element being of substantially triangular shape in cross section.

In testimony whereof I affix my signature.

EMANUEL A. SPEEGLE.